(12) United States Patent
Lu et al.

(10) Patent No.: US 12,501,738 B2
(45) Date of Patent: Dec. 16, 2025

(54) WAVEGUIDE DUAL-DEPLETION REGION (DDR) PHOTODIODES

(71) Applicant: Infinera Corporation, San Jose, CA (US)

(72) Inventors: Mingzhi Lu, Fremont, CA (US); Peter W. Evans, Tracy, CA (US)

(73) Assignee: Infinera Corporation

( * ) Notice: Subject to any disclaimer, the term of this patent is extended or adjusted under 35 U.S.C. 154(b) by 400 days.

(21) Appl. No.: 17/106,180

(22) Filed: Nov. 29, 2020

(65) Prior Publication Data

US 2022/0173257 A1   Jun. 2, 2022

(51) Int. Cl.
| | |
|---|---|
| *H10F 77/40* | (2025.01) |
| *G02B 6/122* | (2006.01) |
| *H04B 10/61* | (2013.01) |
| *H10F 30/223* | (2025.01) |
| *H10F 77/124* | (2025.01) |

(52) U.S. Cl.
CPC ........ *H10F 77/413* (2025.01); *G02B 6/1228* (2013.01); *H04B 10/61* (2013.01); *H10F 30/223* (2025.01); *H10F 77/1248* (2025.01)

(58) Field of Classification Search
CPC .. H01L 31/02327; H01L 31/105; H04B 10/61
See application file for complete search history.

(56) References Cited

U.S. PATENT DOCUMENTS

| | | | | |
|---|---|---|---|---|
| 2002/0038900 A1* | 4/2002 | Yamauchi | ................ | G02B 6/42 257/432 |
| 2007/0133636 A1* | 6/2007 | Park | ..................... | H01L 31/105 257/E31.019 |

* cited by examiner

*Primary Examiner* — Tae-Sik Kang
(74) *Attorney, Agent, or Firm* — Nokia Technologies Oy (57) ABSTRACT

Consistent with the present disclosure, a DDR photodiode is provided on a substrate adjacent to a passive waveguide. In order to efficiently capture light output from the waveguide, the photodiode is coupled to the waveguide with a butt-joint. As a result, the photodiode and the waveguide abut one another such that the dominant mode of light propagating in the waveguide parallel to the substrate is supplied directly to a side of the absorber layer of the photodiode without, in one example, evanescent coupling, nor is a resonant coupler required to supply light to the photodiode. Thus, light is absorbed more efficiently in the photodiode such that the photodiode may have a shorter length. In addition, since substantially all light is input to the photodiode, nearly complete absorption and nearly ideal quantum efficiency can be achieved in a relatively short length. Further, the improved linearity associated with DDR photodiodes is preserved with the exemplary butt joint configurations disclosed herein.

21 Claims, 11 Drawing Sheets

Fig. 7

WAVEGUIDE DUAL-DEPLETION REGION (DDR) PHOTODIODES

BACKGROUND

Optical communication systems are known whereby one or more optical signals, each being modulated to carry information, are transmitted from an optical transmitter to an optical receiver. The optical receivers typically includes, among other things, one or more photodiodes that convert the received optical signals into corresponding electrical signals, which are then further processed. In certain optical communication systems, various components or devices in the receiver are integrated on a common substrate as a photonic integrated circuit (PIC). Such components include optical waveguides and photodiodes that, in some instances, receive light supplied by the optical waveguides.

So-called dual-depletion region (DOR) photodiodes are known in which an "absorber" layer is located above an undoped layer of bandgap wider than the absorber, in such a manner that photo-generated holes have a shorter distance to travel to the p-type region anode above the absorber, while photo-generated electrons have a longer distance to travel to the n-type region cathode below the undoped layer. The depletion region extends from above the absorber layer to below the lower undoped layer. Since electron mobility is much higher than hole mobility in InP and related materials, the total transit time of such holes and electrons from the absorber to their respective contacts is comparable or minimized. A similar photodiode without a undoped layer below the absorber would have much higher capacitance, and a similar photodiode with an absorber as thick as the two undoped layers can absorb too much light at the input so that the high speed photocurrent response is nonlinear. Accordingly, carrier lifetime in the DOR photodiode is reduced, and the length and capacitance of the photodiode may be optimized for both high responsivity and high radio frequency (RF) bandwidth.

Conventional DOR photodiodes detect light that is incident at a direction that is normal to the substrate upon which the DOR photodiode is provided. PICs, however, include optical waveguides that confine optical signals, whereby the optical signals propagate in the optical waveguides in a direction parallel to the substrate. Accordingly, conventional DOR photodiodes may not be suitable for integration in a PIC, and the associated benefits of such photodiodes may be difficult to obtain in optical receivers including PICs.

SUMMARY

Consistent with an aspect of the present disclosure, an optical receiver is provided that comprises a substrate and an optical waveguide having a core layer provided on a first region of the substrate. The receiver also includes a photodiode provided on a second region of the substrate, such that an interface between the optical waveguide and the photodiode constitutes a butt joint. The photodiode includes a first semiconductor layer having a p-conductivity type, the first semiconductor layer being a p-type cladding layer. The photodiode also includes a second semiconductor layer having n-conductivity type, the second semiconductor layer being an n-type cladding layer. Further, the photodiode includes an absorber layer provided between the p-type cladding layer and the n-type cladding layer. The absorber layer has a first undoped semiconductor layer, such that the absorber layer is aligned with the core layer of the optical waveguide to receive, via the interface, an optical signal propagating in the optical waveguide. Moreover, the photodiode includes a second undoped semiconductor layer provided between the absorber layer and the second semiconductor layer, such that in an absence of a reverse bias applied to the photodiode, a first depletion region forms in the absorber layer and a second depletion region forms in the second undoped semiconductor layer.

Consistent with a further aspect of the present disclosure, an optical receiver is provided that comprises a substrate and an optical waveguide provided on a first region of the substrate. In addition, the optical receiver includes a photodiode provided on a second region of the substrate, such that an interface between the optical waveguide and the photodiode constitutes a butt joint. Further, the photodiode is configured to receive an optical signal supplied by the optical waveguide, wherein the optical signal has a propagation direction in the optical waveguide. The interface between the optical waveguide and the photodiode is provided at a non-orthogonal angle relative to the direction of propagation of the optical signal.

Consistent with an additional aspect of the present disclosure, an optical receiver is provided that comprises a substrate and an optical waveguide provided on a first region of the substrate. Further, a photodiode provided on a second region of the substrate, such that an interface between the optical waveguide and the photodiode constitutes a butt joint. The photodiode is configured to receive an optical signal supplied by the optical waveguide, wherein the optical signal propagates in the optical waveguide in a propagation direction, and the optical signal propagates in the photodiode in the same propagation direction. A width of the optical waveguide increases in the propagation direction.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

BRIEF DESCRIPTION OF THE DRAWINGS

FIG. 4 shows a perspective view of a waveguide-photodiode configuration shown in FIG. 3a;

DESCRIPTION OF THE EMBODIMENTS

Consistent with the present disclosure, a DOR photodiode is provided on a substrate adjacent to a passive waveguide. In order to efficiently capture light output from the waveguide, the photodiode is coupled to the waveguide with a butt-joint. As a result, the photodiode and the waveguide abut one another such that the dominant mode of light propagating in the waveguide parallel to the substrate is supplied directly to a side of the absorber layer of the photodiode without, in one example, evanescent coupling, nor is a resonant coupler required to supply light to the photodiode. Thus, light is absorbed more efficiently in the photodiode such that the photodiode may have a shorter length. In addition, since substantially all light is input to the photodiode, nearly complete absorption and nearly ideal quantum efficiency can be achieved in a relatively short length. Further, the improved linearity associated with DOR photodiodes is preserved with the exemplary butt joint configurations disclosed herein.

Reference will now be made in detail to the present exemplary embodiments of the disclosure, which are illustrated in the accompanying drawings. Wherever possible, the same reference numbers will be used throughout the drawings to refer to the same or like parts.

Figure 1:
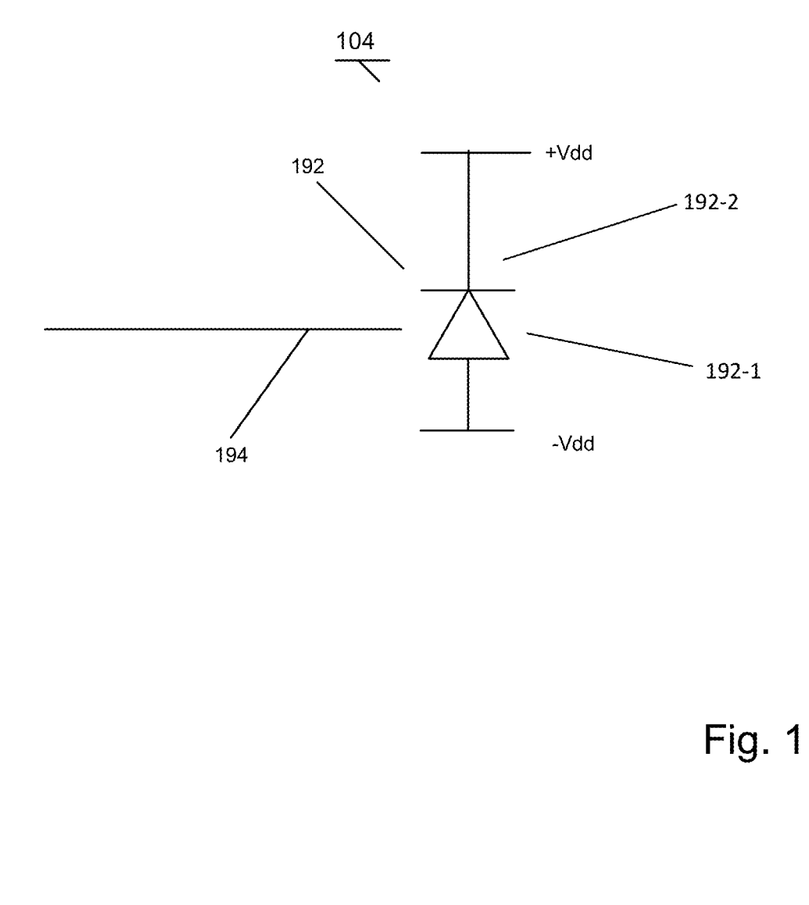
FIG. 1 shows an optical receiver employing direct detection consistent with an aspect of the present disclosure.

FIG. 1 shows a high level circuit diagram of receiver 104 consistent with an aspect of the present disclosure. Receiver 104 includes a waveguide 194 that carries optical signals which may be amplitude modulated. The optical signals are supplied to photodiode 192, which may be appropriately biased. In one example, the photodiode is reversed biased such that a positive reference or bias voltage +Vdd is supplied to cathode 192-2 and a negative reference or bias voltage −Vdd is supplied to anode 192-1.

Figure 2A:
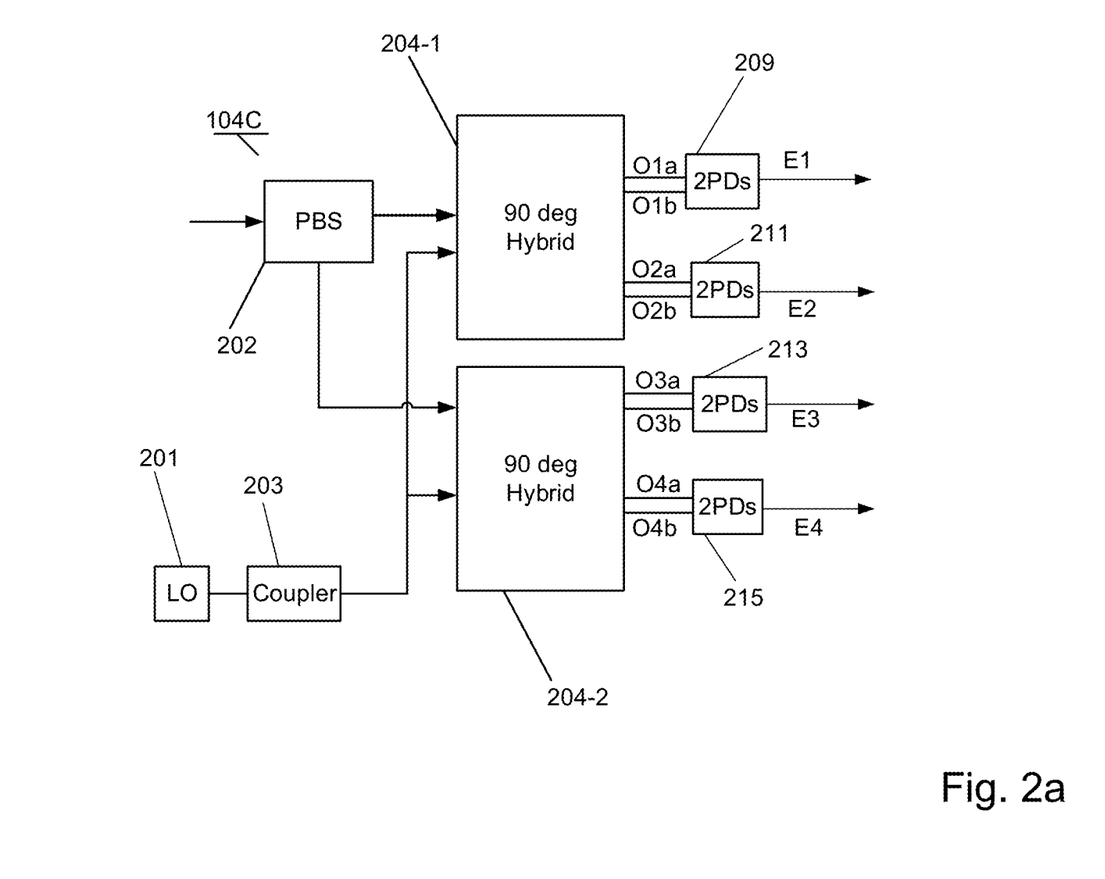
FIG. 2a shows an optical receiver employing coherent detection consistent with an additional aspect of the present disclosure.

FIG. 2a shows coherent optical receiver 104c, which is another example of an optical receiver consistent with the present disclosure. In one example, a polarization multiplexed optical signal is supplied to receiver 104C. In that case, receiver 104 may include a polarization beam splitter (PBS) 202 operable to receive the input optical signal and to separate the signal into orthogonal polarizations, i.e., vector components of the optical E-field of the incoming optical signal transmitted on optical fiber medium 108, into signals X and Y. One of the polarizations is parallel to the local oscillator (LO) polarization, and the other is rotated to be parallel to the LO (201). The LO output is split by an optical coupler (203). X and Y light are then each mixed with portions of the LO output in their own 90 degree optical hybrid circuits ("hybrid") 204-1 and 204-2. Hybrid 204-1 outputs four optical signals O1 a, O1 b, O2a, and O2b, and hybrid 204-2 outputs four optical signals O3a, O3b, O4a, and O4b, each representing the in-phase and quadrature components of the optical E-field of X and Y signals, and each including light from local oscillator 201 and light from polarization beam splitter 202 or mixing products. Optical signals O1 a, O1 b; O2a, O2b; O3a, O3b; and O4a, O4b are supplied to respective one of photodetector circuits 209, 211, 213, and 215. Each photodetector circuit includes a pair of photodiodes ("2PDs") configured as single ended or else as balanced detector, as shown in the example FIG. 2b.

Figure 2B:
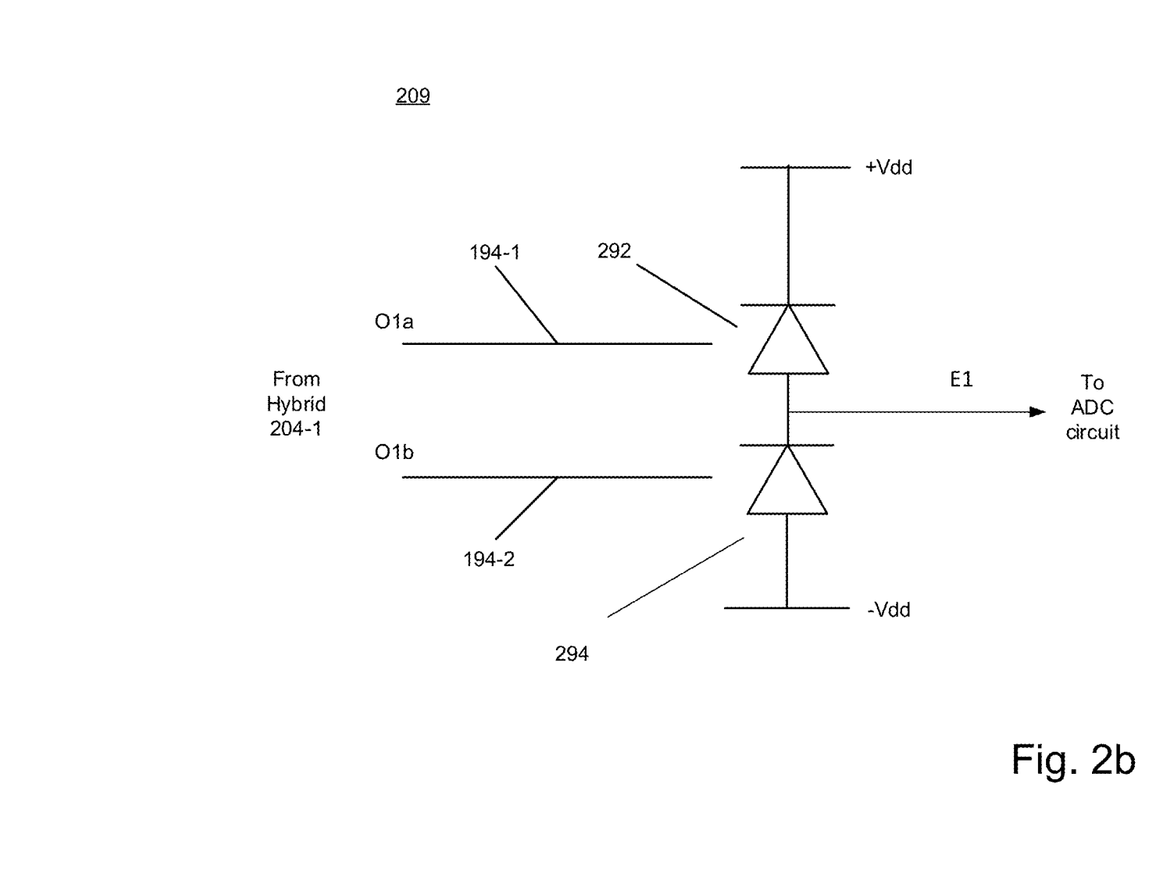
FIG. 2b shows an example of a balanced (differential) detector consistent with the present disclosure.

FIG. 2b shows photodetector circuit 209 in greater detail. It is understood that remaining photodetector circuits 211, 213, and 215 have a similar construction and operate in a similar manner as photodetector circuit 209. As shown in FIG. 2b, optical waveguides 194-1 and 194-2 supply optical signals O1 a and O1 b, respectively, from optical hybrid 204-1 to a corresponding one of photodiodes 292 and 294. Photodiodes 292 and 294 are connected in a balanced detector configuration, and the output, E1, of photodetector circuit 209 is supplied to a transimpedance amplifier (TIA) circuit, whose output then supplies an analog-to-digital conversion (ADC) circuit for further processing.

Each of remaining photodetector circuits 211, 213, and 215 generates a corresponding one of electrical signals E2 to E4 in a similar manner as that described above with respect to photodetector circuit 209. Signals E2 to E4 are also supplied to respective TIA/ADC circuits. Electrical signals E1 to E4 are indicative of data carried by optical signals input to PBS 202.

Figure 3A:
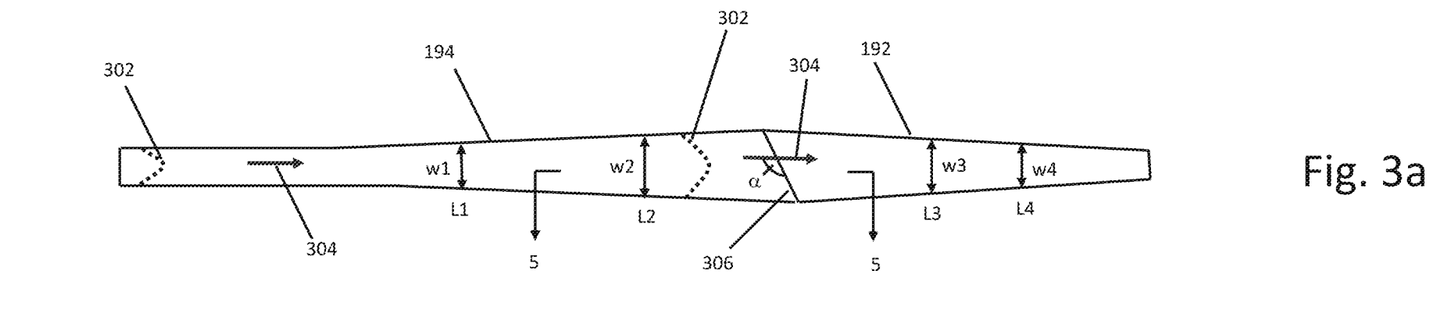
FIGS. 3a-3c show plan view of waveguide-photodiode combinations consistent with aspects of the present disclosure.
Figure 3B:
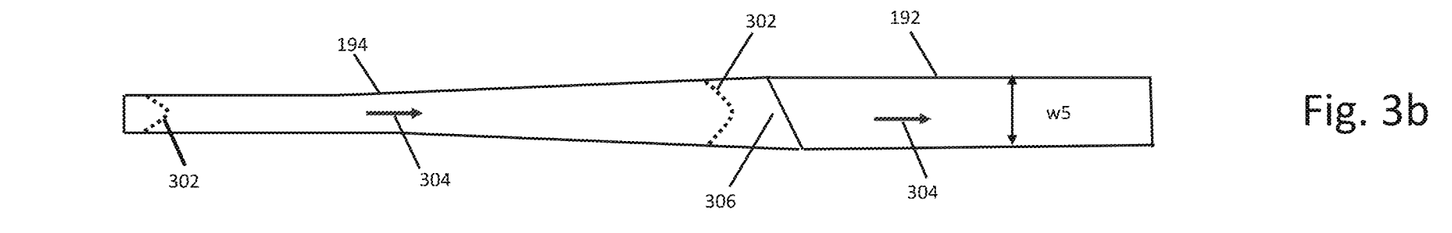
Figure 3C:
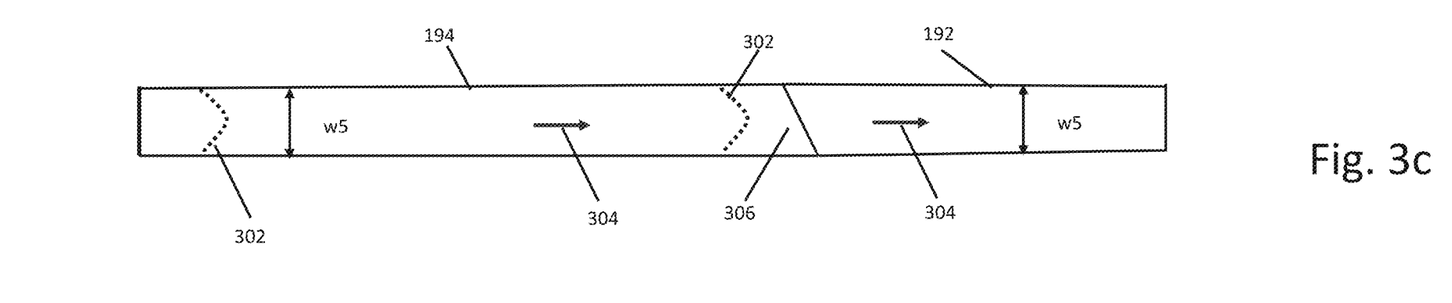

FIGS. 3a to 3c show plan views or layouts of examples of passive waveguide-photodiode combinations consistent with the present disclosure. As shown in FIG. 3a an optical signal represented by optical mode 302 propagates in direction 304 in waveguide 194. Waveguide 194 has a width transverse to direction 304 that increases in direction 304. For example, at location L1, waveguide 194 has a width w1, and, at location L2, waveguide 194 has a width w2 that is greater than width w1. Location L1 is farther away from interface 306 than location L2.

As further shown in FIG. 3a, interface 306 is present between optical waveguide 194 and photodiode 192. In one example, interface 306 constitutes a butt joint, whereby photodiode 192 is configured to receive optical mode 302 directly from optical waveguide 194. Moreover, in the example shown in FIG. 3a, interface 306 is oriented or provided at a non-orthogonal angle a relative to direction 304. Angle a may have a magnitude that is greater than or equal to 5° and less than or equal to 85°.

Optical mode or signal 302 next propagates into photodiode 192 and is absorbed along a length of photodiode 192. In one example, a width of photodiode 192 narrows in a direction corresponding to propagation direction 304, such that at location L3 photodiode 192 has a width w3, which is greater than a width w4 of photodiode 192 at location L4. Location L3 is nearer interface 306 than location L4.

In another example, as shown in FIG. 3b, a first outer edge of photodiode 192 and a second outer edge of photodiode 192 together define therebetween the width w5 of photodiode 192 extending transverse to both the first edge of photodiode 192 and the second edge of photodiode 192. The width w5 of photodiode 192 is uniform along a length of the photodiode 192 that extends in a propagation direction 304 that is orthogonal to width w5. However, along a length of waveguide 194, the width of optical waveguide 194 increases in a direction corresponding to propagation direction 304, as shown in FIG. 3b. Moreover, as is also shown in FIG. 3b, interface 306 between optical waveguide 194 and photodiode 192 is provided at a non-orthogonal angle relative to propagation direction 304, as well as relative to each of the first edge of photodiode 192 and the second edge of the photodiode 192.

In a further example, as shown in FIG. 3c, both waveguide 194 and photodiode 192 have the same width w5, and such width is uniform in propagation direction 304.

Figure 4:
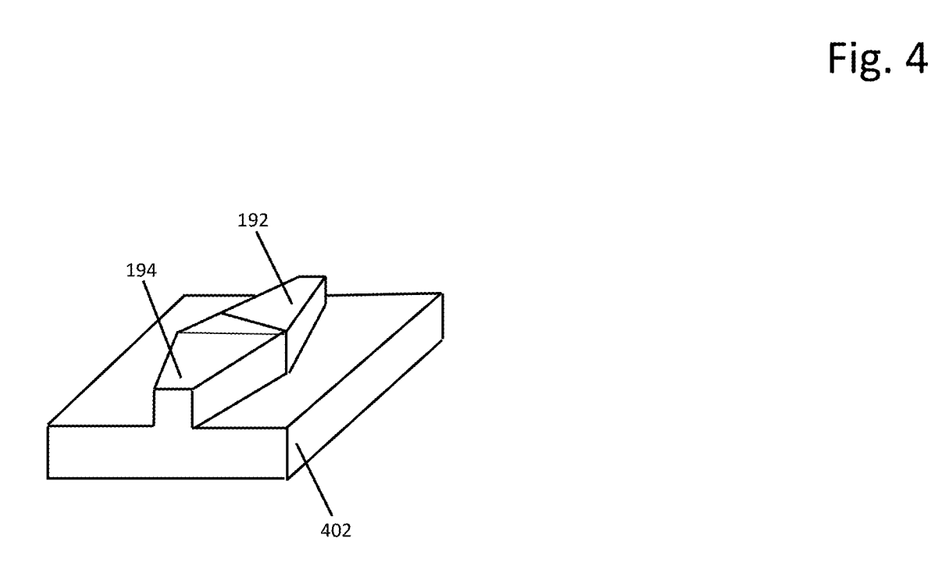

FIG. 4 shows a perspective view of waveguide 194 and photodiode 192 corresponding to the configuration shown in FIG. 3a.

Figure 5A:
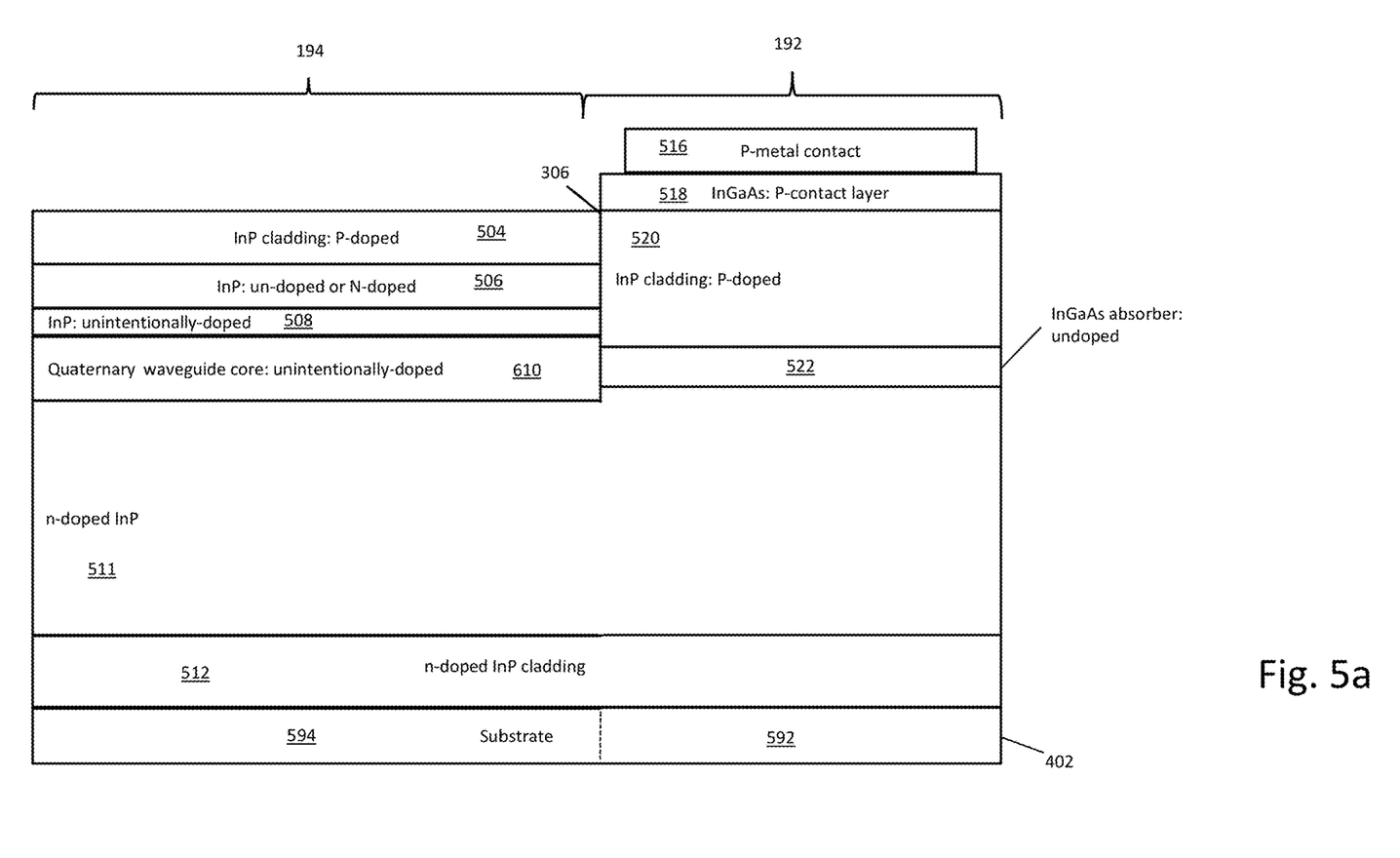
FIG. 5a shows a cross-sectional view of photodiode and waveguide consistent with a further aspect of the present disclosure.

FIG. 5a shows a view of waveguide 194 and photodiode 192 taken along cross-section 5 (see FIG. 3a) adjacent interface 306. It is understood that, in one example, waveguide 194 and photodiode 192 shown in FIGS. 3b and 3c will have a similar construction as that shown FIG. 5a, and, in further examples, waveguide 194 and photodiode 192 have the structures shown in FIGS. 5b and 5c.

As shown in FIG. 5a, waveguide 194 is provided on region 594 of substrate 404, and photodiode 192 is provided on region 592. N-type cladding layer 512, in one example, may be provided on substrate 402 that extends over both regions 594 and 592. The n-type cladding layer includes, in a further example, indium phosphide (InP). An additional n-type or n-doped layer 511 may be provided on a first cladding layer 512. Layer 511 may also extend over both region 594 and region 592. Layer 511 may also include InP.

As further shown in FIG. 5a, waveguide 194 provided over region 594 includes, in one example, a core layer 610, which includes a quaternary semiconductor material, such as, indium gallium arsenide phosphide (InGaAsP) or other suitable quaternary semiconductor material, such as AlGaInAs. Layer 610 is typically undoped or else lightly doped (::s;1E17) n-type. As used herein, undoped means unintentionally doped or a doping concentration that is less than or equal to 1×1016. Waveguide 194 may also include undoped or n– layer 508, which is further provided on region 594, and a layer 506 provided on layer 508. Layer 508 may be undoped or lightly doped n–. Waveguide 194 provided over region 594 further includes a second cladding layer 504, which, in one example, is doped p-type or implanted with H or He to be semi-insulating, and, in further example includes InP.

Photodiode 192, as noted above, is formed over region 592 of substrate 404. Photodiode 192 may be a DOR photodiode including an absorber layer. In the example shown in FIG. 5a, photodiode 192 includes absorber layer 522, which includes, for example, indium gallium arsenide (InGaAs). In a further example, absorber layer 522 is undoped or undoped. Photodiode 192 further includes cladding layer 520, which may be p-type and includes InP. Cladding layer 520 is provided on absorber layer 522. In addition, contact layer 518, which is also p-type and includes InGaAs, may be provided on p-type cladding 520. As further shown in FIG. 5a, an additional contact layer 516 including a conductor or metal may be provided on contact layer 518.

As noted above, the absorber layer, such as layer 522 of photodiode 192 in configured with undoped layer 508 below or has a thickness or electron/hole mobility combination such that photo-generated holes have a shorter distance to travel to the p-type anode (520) while photo-generated electrons have a longer distance to travel to then-type cathode (511) or photodiode 192. As further noted above, since the electron mobility is higher than the hole mobility for InP and related materials, the transit time of such holes and electrons is substantially the same. Accordingly, carrier lifetime in the photodiode 192 is reduced, and radio frequency (RF) bandwidth is increased.

Moreover, absorber layer 522 is provided in a manner to be aligned with and abuts core layer 610 of waveguide 192, such that light is efficiently input to absorber layer 522 via interface 306 with minimal loss.

Figure 5B:
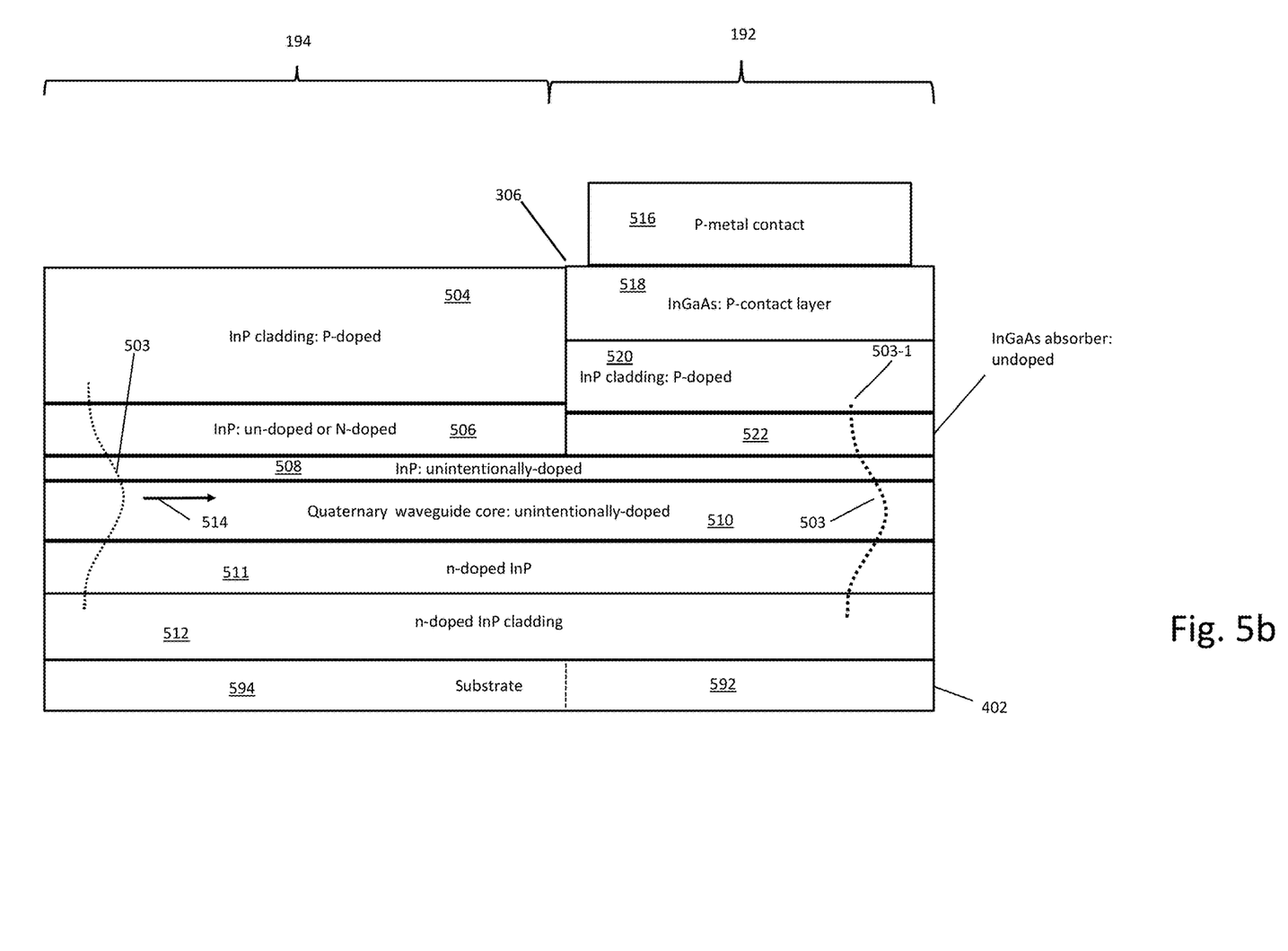
FIG. 5b shows a cross-sectional view of photodiode and waveguide consistent with an additional aspect of the present disclosure.

FIG. 5b shows an example similar to that shown in FIG. 5a. In FIG. 5b, however, each of optical core layer 510 and layer 508 extends over both region 594 and region 592, and each constitutes a respective layer of each of the waveguide 194 and the photodiode 192. In the example shown in FIG. 5b an optical mode or optical signal 503 propagates in a direction indicated by arrow 514 in core 510. In photodiode 192, a tail portion 503-1 or mode 503 extends into absorber layer 522, and this generates electron-hole pairs in a manner similar to that described above. In FIG. 5b, mode 503 is evanescently coupled to absorber 522.

Figure 5C:
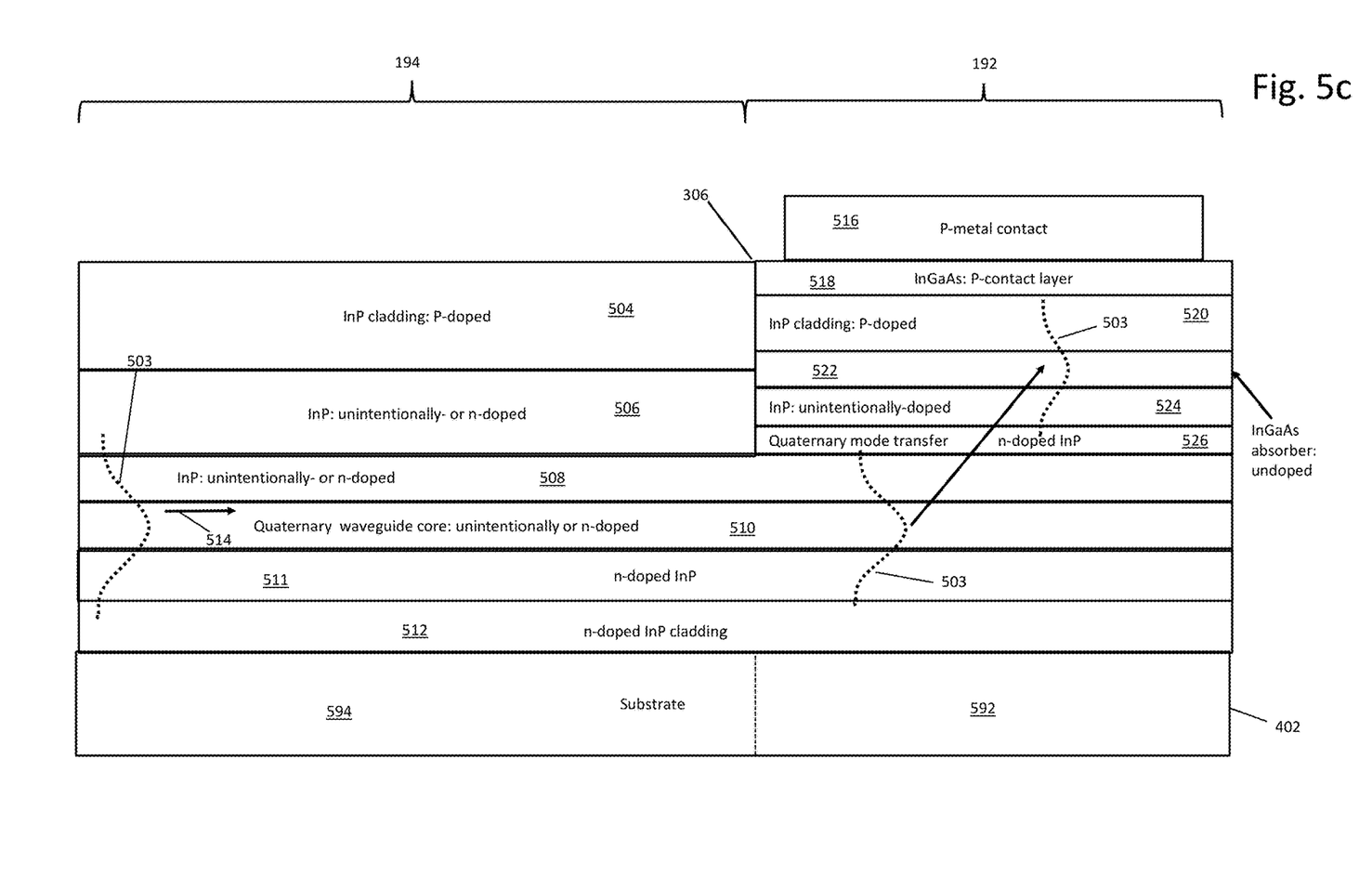
FIG. 5c shows a cross-sectional view of photodiode and waveguide consistent with a further aspect of the present disclosure.

FIG. 5c shows an example similar to that shown in FIG. 5b. In FIG. 5c, however, photodiode 192 includes an undoped layer 524 and an undoped or n-doped layer 526 provided between layer 508 and absorber layer 522. Layer 524 is provided on quaternary layer 526, in this example. In this example, layer 524 includes, for example, InP that is undoped and layer 526 includes n-type InP.

In the examples shown in FIG. 5c, optical mode or optical signal 503 propagates in waveguide 194 in the direction indicated by arrow 514. Layers 524 and 526 are configured to facilitate a quaternary mode transfer from core 510 to absorber 522 by way of resonate coupling. As a result, mode 503 generates electron-hole pairs in absorber layer 522 in a manner similar to that described above.

In each of the examples shown in FIGS. 5a-5c, appropriate biases are applied to contact 516 and a contact, for example, to substrate 402 so that the above-described electron-hole pairs generate a photocurrent indicative of the optical signal 503.

Figure 6:
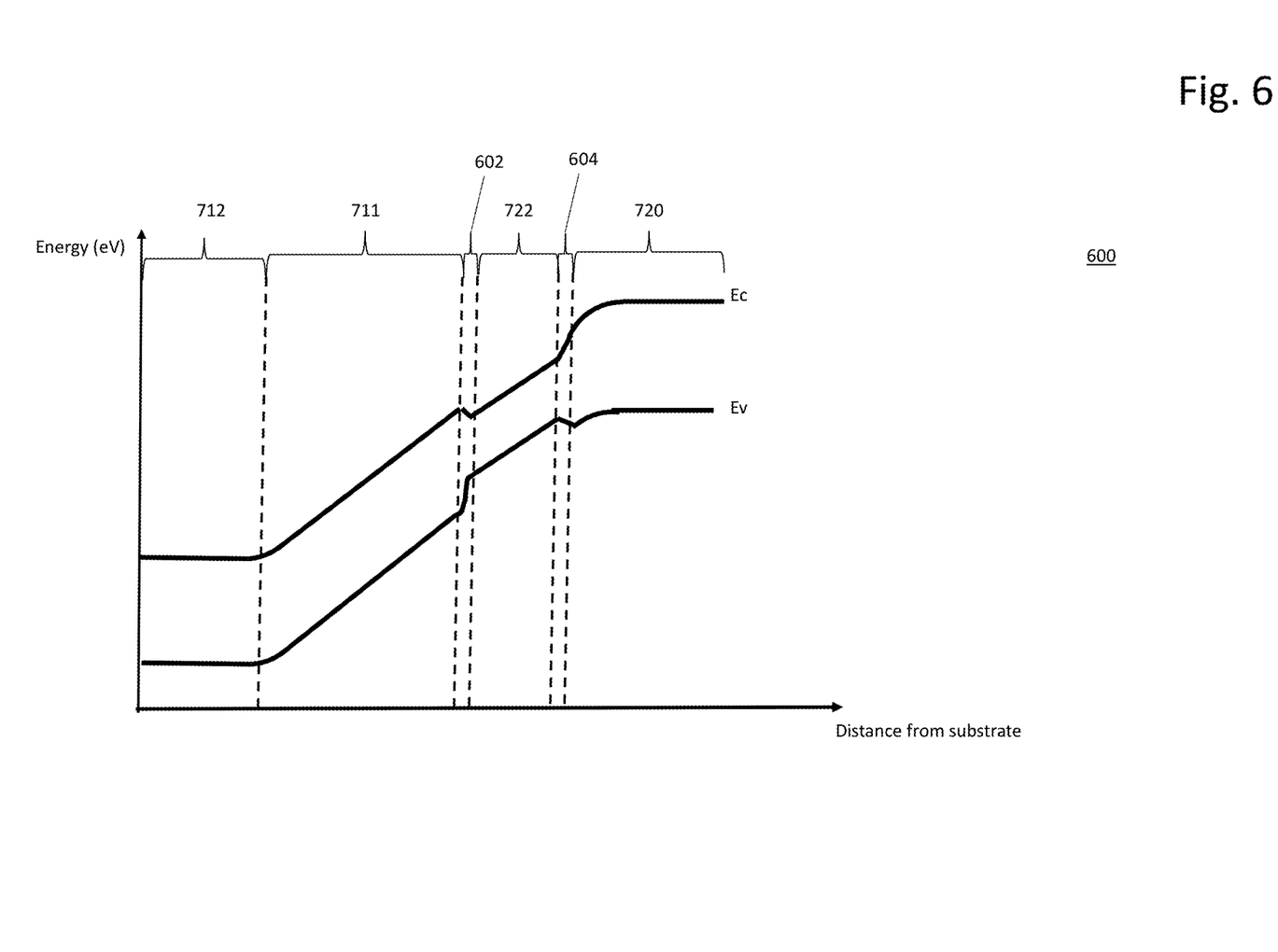
FIG. 6 shows an example of an energy band diagram consistent with an additional aspect of the present disclosure.

FIG. 6 shows an example of an energy band diagram 600 consistent with a further aspect of the present disclosure. As shown in FIG. 6, energy band diagram 600 includes regions 712, 711, 722, and 720 corresponding to the energy bands present in layers 511, 508, 522 and 520 of FIG. 5a. Energy band diagram 600 further includes "band smoothing" regions 602 and 604, which, in one example, includes a layer or layers comprising a quaternary semiconductor alloy, such as InxGa1-xAsyP1-y, with a bandgap intermediate between that of the InGaAs absorber and InP that facilitates carrier transit. Region 602 may be provided between InP layer 508 and absorber layer 522, and region 604 may be provided between absorber layer 522 and InP layer 520 in FIG. 5a. In one example, the concentration of phosphorus in the quaternary alloy InxGa1-xAsyP1-y varies continuously along a thickness of region 602 and varies along a thickness of region 604, e.g., in a direction away from the substrate (along the x-axis in FIG. 6). Alternatively, the smoothing region 602 and 604 includes one or more layers, including a ternary semiconductor alloy or composition, and each layer within the band smoothing region may have a discrete composition and corresponding bandgap. Thus, band smoothing region 602 may include either a quaternary or ternary semiconductor alloy and band smoothing region 604 may include either a quaternary or ternary semiconductor alloy.

As further shown in FIG. 6, band smoothing region 604 is provided between region 720 (corresponding to layer 520) and region 722 (corresponding to absorber layer 522). A valence band edge Ev within region 604 has an associated first energy that is between a second energy associated with a valence band edge Ev within region 722 and a third energy associated with a valance band edge Ev within region 720. In addition, band smoothing region 602 is provided between region 722 and region 711 (corresponding to layer 508). A conduction band edge Ee within region 602 has an associated fourth energy that is between a fifth energy associated with a conduction band edge Ee within region 722 and a sixth energy associated with a conduction band edge Ee within region 711.

In each of the above example, the concentration of phosphorus in the band smoothing regions 602 and 604 may vary along a thickness of such regions, e.g., in a direction along the x-axis in FIG. 6.

In a further example, each of band smoothing regions 602 and 604 includes AlGaInAs.

Figure 7:
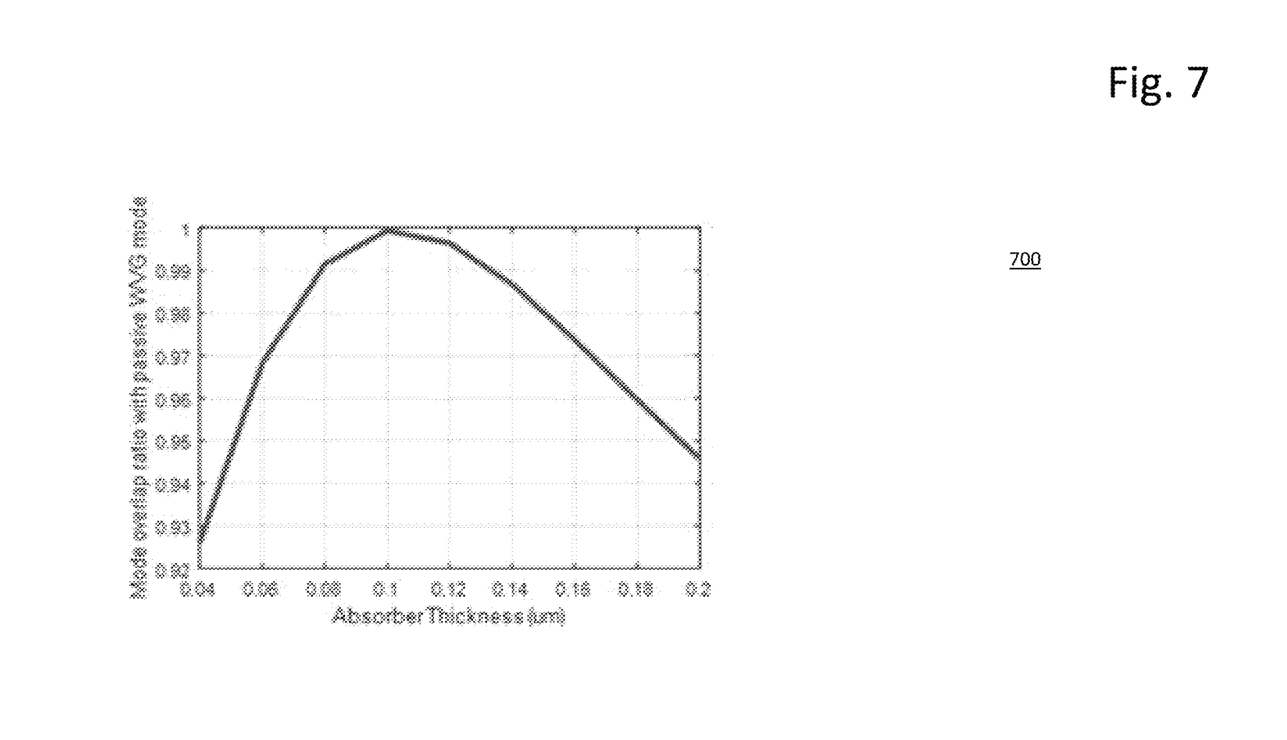
FIG. 7 is a plot of mode overlap ratio with a passive waveguide vs. absorber thickness consistent with an aspect of the present disclosure.

FIG. 7 is a plot 700 of the overlap ratio of the optical mode in photodiode 192 to the optical mode in waveguide 194 vs absorber thickness for FIG. 5a. FIG. 7 shows an example in which an absorber thickness of 0.1 microns results in a maximum amount of overlap of the optical modes propagating in waveguide 192 and photodiode 194, nearly 100%.

Figure 8:
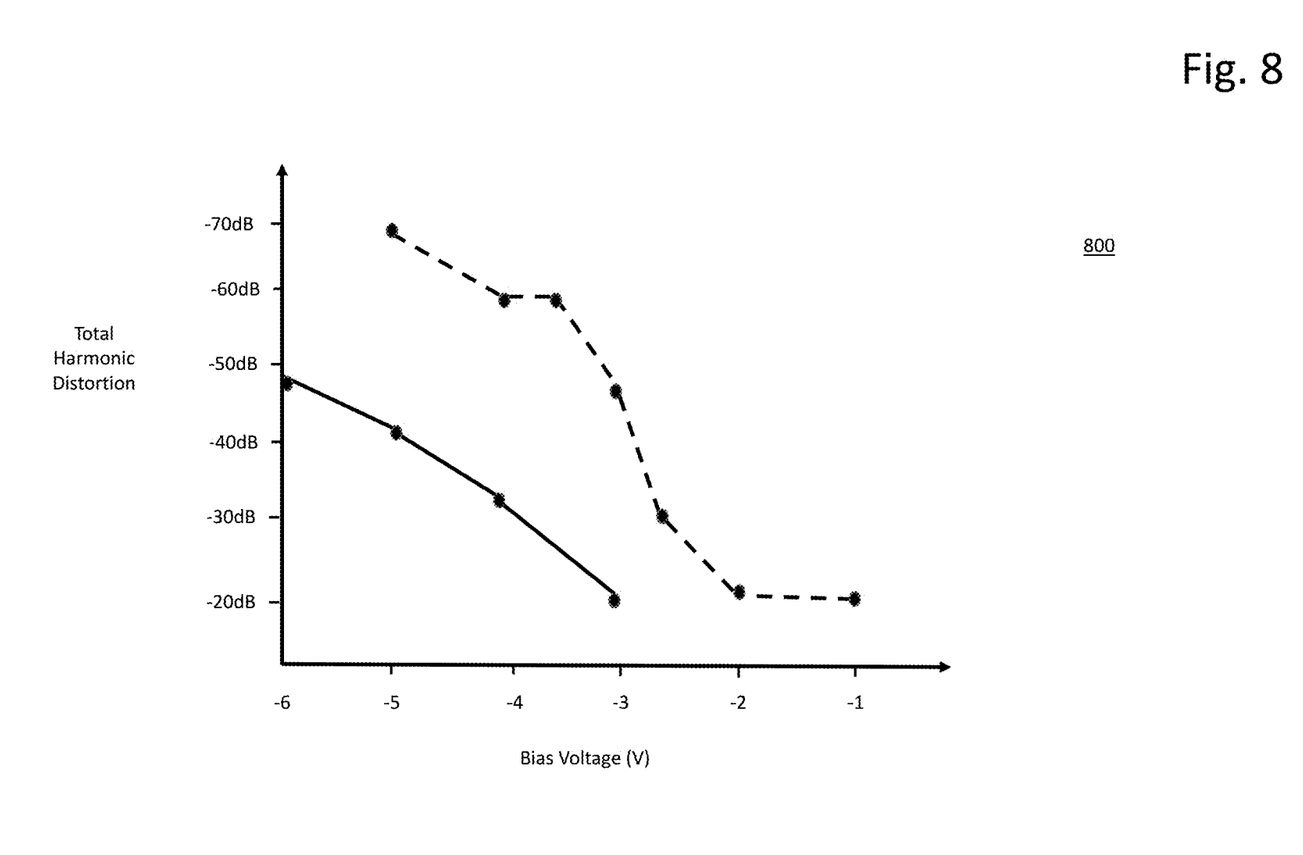
FIG. 8 shows plots of total harmonic distortion vs. bias voltage consistent with an additional aspect of the present disclosure.

FIG. 8 illustrates plots 800 of total harmonic distortion (THO) for two DOR photodiodes consistent with aspects of the present disclosure. These plots were generated in connection with an example in which light output from two lasers was mixed to obtain a beating signal having a 1 GHz beating tone. The beating signal was received by a photodiode consistent with the present disclosure, such as photodiode 192. The total harmonic distortion may be defined as the ratio between the total power of the harmonics (2 GHz, 3 GHz, etc.) over the RF power at 1 GHz. Optical signals incident from the two lasers provide photocurrents of 4.6 mA and 0.4 mA, respectively. The dashed curved in FIG. 8 represents the THO as a function of bias voltage of a photodiode having band smoothing layers similar to those described above. The solid curve represent the THO as a function of bias voltage of a photodiode without smoothing layers. The dashed curve indicates that for a given bias voltage, the THO, and thus the linearity is greater for the photodiode having smoothing layers, such as a band smooth layer between the p-type core layer 520 and absorber layer 522, and between 522 and 508 below, than that of the photodiode without such smoothing layers. The measurements depicted in FIG. 8 were obtained from photodiodes with a 3 micron input width.

In a further example, a responsivity of 1.1. A/W was measured in connection with a 25 micron long photodiode.

Other embodiments will be apparent to those skilled in the art from consideration of the specification. It is intended that the specification and examples be considered as exemplary only, with a true scope and spirit of the invention being indicated by the following claims.

What is claimed is:

1. An optical receiver, comprising:
    A substrate comprising a plurality of regions including at least a first region and a second region;
    an optical waveguide comprising a plurality of semiconductor layers provided on the first region of the substrate, the plurality of semiconductor layers including at least a core layer and a second waveguide layer;
    a photodiode provided on the second region of the substrate to the exclusion of the first region of the substrate, the photodiode comprising:
    a first semiconductor layer having a p-conductivity type, the first semiconductor layer being a p-type cladding layer,
    a second semiconductor layer having a n-conductivity type, the second semiconductor layer being an bn-type cladding layer,
    an absorber layer provided between the p-type cladding layer and the n-type cladding layer, the absorber layer including a first undoped semiconductor layer, such that the absorber layer is disposed relative to the optical waveguide to receive an optical signal propagating in the optical waveguide, and
    a second undoped semiconductor layer, the second undoped semiconductor layer having a bandgap, which is wider than a bandgap of the absorber layer, the second undoped semiconductor layer is provided between the absorber layer and the second semiconductor layer, such that, in an absence of a reverse bias applied to the photodiode, the first and second semiconductor layers and the absorber layer are depleted;
    wherein each of the second waveguide layer and the second undoped semiconductor layer is a respective portion of a same semiconductor layer of the optical receiver that extends over at least respective portions of both the first region of the substrate and the second region of the substrate.

2. The optical receiver in accordance with claim 1, wherein the absorber layer includes indium gallium arsenide.

3. The optical receiver in accordance with claim 2, wherein the second undoped semiconductor layer includes indium phosphide.

4. The optical receiver in accordance with claim 1, wherein the n-type cladding layer includes indium phosphide.

5. The optical receiver in accordance with claim 1, wherein the p-type cladding layer includes indium phosphide.

6. The optical receiver in accordance with claim 1, further including a band smoothing region provided between the p-type cladding and the absorber layer, the band smoothing region has a valence band edge having an associated first energy that is between a second energy associated with a valence band edge of the absorber layer and a third energy associated with a valance band edge of the first semiconductor layer.

7. The optical receiver in accordance with claim 6, wherein a composition of the band smoothing region changes along a thickness of the band smoothing region.

8. The optical receiver in accordance with claim 6, wherein the band smoothing region is indium gallium arsenic phosphide.

9. The optical receiver in accordance with claim 6, wherein the semiconductor alloy includes AlGaInAs.

10. The optical receiver in accordance with claim 6, wherein the band smoothing region includes a ternary semiconductor alloy or a quaternary semiconductor alloy.

11. The optical receiver in accordance with claim 10, wherein a concentration of phosphorus in the smoothing region changes along a thickness of the smoothing region.

12. The optical receiver in accordance with claim 1, further including:
    a first band smoothing region provided between the first semiconductor layer and the absorber layer, the first band smoothing region has a valence band edge having an associated first energy that is between a second energy associated with a valence band edge of the absorber layer and a third energy associated with a valance band edge of the first semiconductor layer; and
    a second band smoothing region provided between the second semiconductor layer and the absorber layer, the second band smoothing region has a conduction band edge having an associated fourth energy that is between a fifth energy associated with a conduction band edge of the absorber layer and a sixth energy associated with a conduction band edge of the first semiconductor layer.

13. The optical receiver in accordance with claim 12, wherein the first and second band smoothing regions include indium gallium arsenic phosphide.

14. The optical receiver of claim 12, wherein the first and second band smoothing regions include AlGaInAs.

15. The optical receiver in accordance with claim 12, wherein the first band smoothing region includes either a first ternary semiconductor alloy or a first quaternary semiconductor alloy or a second quaternary semiconductor alloy.

16. The optical receiver in accordance with claim 13, wherein a concentration of phosphorus in the first smoothing region changes along a thickness of the first smoothing region, and a concentration of phosphorus in the second smoothing region changes along a thickness of the second smoothing region.

17. The optical receiver in accordance with claim 1, wherein the optical signal is amplitude modulated.

18. The optical receiver in accordance with claim 1, wherein the optical signal is modulated in accordance with a m-quadrature amplitude modulation (M-QAM) modulation format, wherein m is a positive integer greater than 1.

19. The optical receiver in accordance with claim 1, wherein the photodiode is a dual depletion region photodiode.

20. The optical receiver in accordance with claim 1, wherein the optical receive further includes:
a local oscillator laser; and
an optical hybrid circuit that receives an optical output from the local oscillator laser, wherein the optical signal being supplied by the optical hybrid circuit.

21. The optical receiver in accordance with claim 1, wherein the absorber layer comprises a quaternary semiconductor alloy including of indium, gallium, arsenic, and aluminum.

* * * * *